United States Patent [19]

Ettridge

[11] 4,058,342

[45] Nov. 15, 1977

[54] CHILD'S CAR SEAT

[76] Inventor: John P. Ettridge, 14 Somers St., North Brighton, South Australia, Australia, 5048

[21] Appl. No.: 740,615

[22] Filed: Nov. 10, 1976

[30] Foreign Application Priority Data

Nov. 14, 1975  Australia .............................. 3966/75

[51] Int. Cl.² .......................................... A47C 1/032
[52] U.S. Cl. ................................. 297/250; 297/321; 297/322; 297/342
[58] Field of Search ............... 297/200, 253, 321, 342, 297/254, 322, 316

[56] References Cited

U.S. PATENT DOCUMENTS

| | | | |
|---|---|---|---|
| 439,303 | 10/1890 | Newton | 297/316 X |
| 540,384 | 6/1895 | Hall | 297/253 |
| 2,272,505 | 2/1942 | Biggs | 297/342 X |
| 2,317,894 | 4/1943 | Doty | 297/253 |
| 2,677,412 | 5/1954 | Thomas | 297/322 X |
| 2,815,794 | 12/1957 | Hendrickson | 297/342 |
| 3,094,356 | 6/1963 | Burke | 297/254 |
| 3,186,762 | 6/1965 | Lucas | 297/250 X |
| 3,922,035 | 11/1975 | Wener | 297/250 |

FOREIGN PATENT DOCUMENTS 519,800  10/1939  United Kingdom ................. 248/395

*Primary Examiner*—Francis K. Zugel
*Attorney, Agent, or Firm*—Oldham & Oldham Co.

[57] ABSTRACT

A child's car seat, the seat having a seat portion and a back rest portion mounted by links on a supporting frame, so that the seat portion can be moved downwardly and forwardly and the back rest portion moves also to increase the angle of slope so that the seat can be moved from a sitting position to a reclining position.

4 Claims, 12 Drawing Figures

CHILD'S CAR SEAT

This invention relates to a seat for supporting a young child in motor vehicles, the seat being adapted to be arranged to be carried by the conventional car seat of a vehicle.

With a child's car seat it is essential that the child be securely restrained into the seat and also that the seat be securely restrained or anchored in relation to the motor vehicle itself, and one of the methods of achieving this is to have a seat belt or strap arrangement on the child's seat for restraining the child into the seat, and to use the conventionally installed seat belts of the vehicle to restrain and anchor the child's car seat to the seat of the vehicle itself.

Also it is very desirable with the child car seats to have the seats adjustable so that the child is in an upright position when the child is awake but that the seat can be moved to a reclined or semi-reclined position when the child wishes to rest or even sleep.

Thus it is an object of this invention to provide a child car seat in which the child is securely restrained in the seat and also the seat itself is securely anchored to the vehicle body through the conventionally installed seat belts.

It is a further object to provide a simple and effective means whereby the child's seat can be moved from an upright to reclining or semi-reclining position to allow the child to sleep therein and it is a further object to provide a mechanism whereby this movement can be easily and readily accomplished.

Thus there is provided according to the invention a child's car seat comprising a base frame adapted to rest on the vehicle seat, a back rest frame extending upwardly and slightly rearwardly therefrom so that the base frame and the back rest generally are at a suitable angle to each other conforming to the general angle of the car seat iself, a seat frame and a seat back attached by linkages to the base and back rest, respectively, and locking means to restrain the seat frame and seat back in their respective upright or semi-reclined position.

Figure 1:
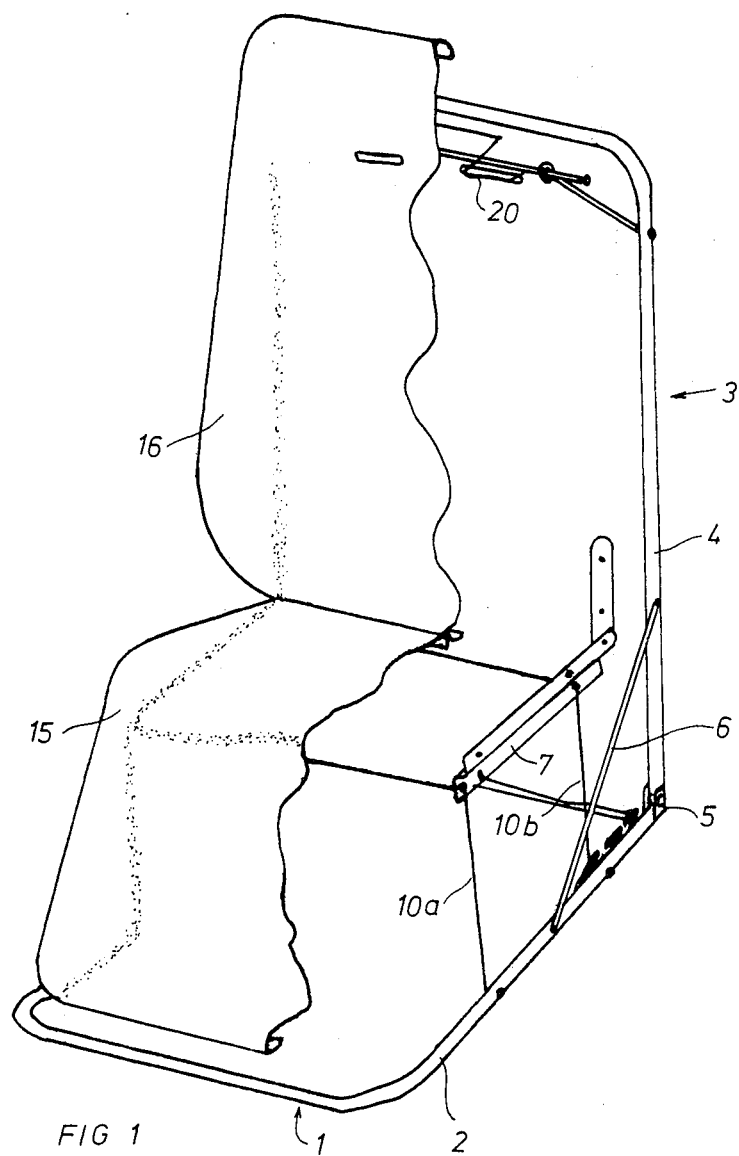
FIG. 1 is a view of the seat parts being broken away for clarity.
Figure 2:
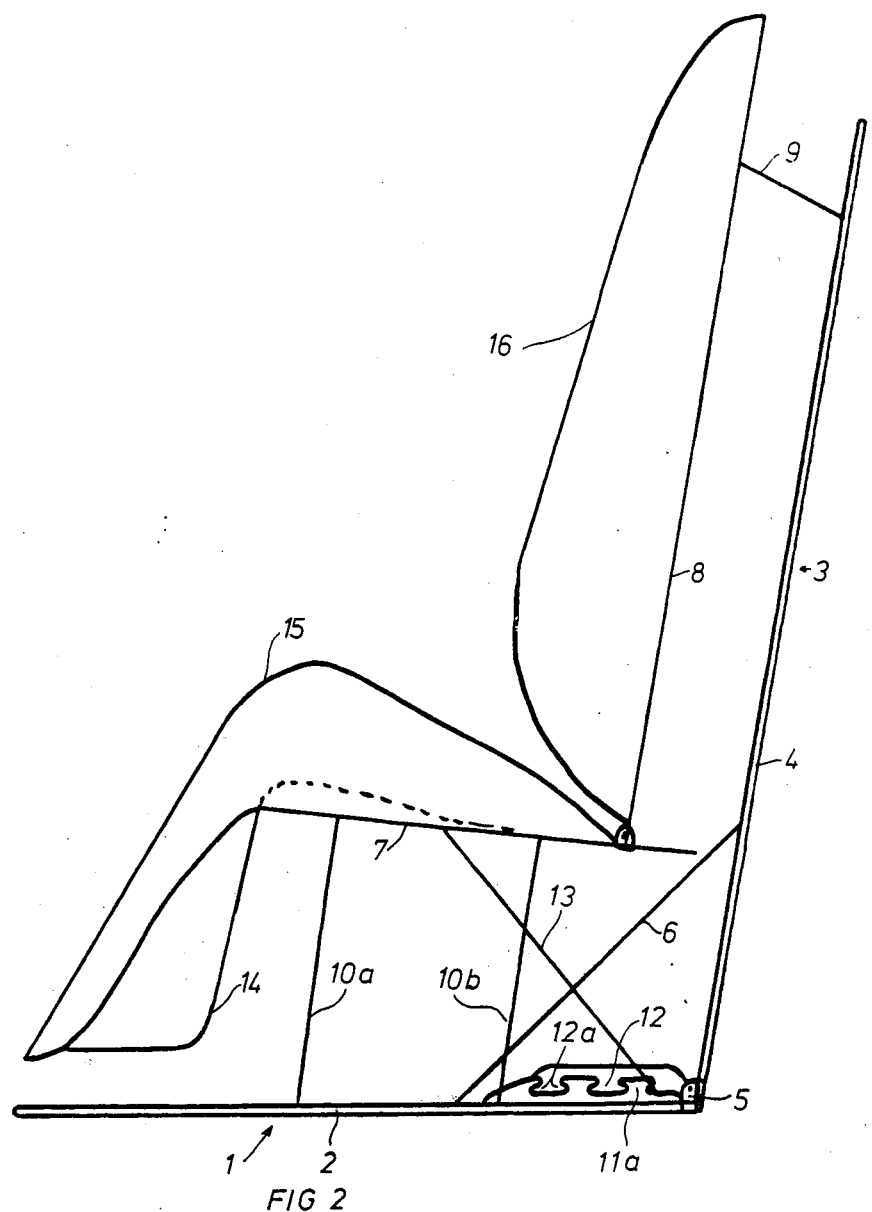
FIG. 2 is a side elevation of the seat.

Preferably the base 1 comprises a U-shaped member 2, and the backrest frame 3 also comprises a U-shaped member 4 these being arranged at a suitable angle to each other these with the open ends of the arms interconnected by a bracket 5 and a suitable bracing stay 6 on each side so that the angle therebetween conforms generally to the angle between the seat and back of a conventional motor vehicle seat. Preferably according to present day standards this could be in the order of 115°.

The child's seat also includes a seat frame 7 which is generally arranged in a parallel manner to the base 1, and a seat back 8 which extends upwardly from the rear of the seat frame towards and is attached by a suitable pivotal means such as a link 9 or the like to the back rest frame 3. The seat frame can preferably be attached by a paralled linkage to the base and the seat back attached by the link 9 acting between the seat back 8 and the back rest frame 3, the parallel linkage mechanism having the links 10a, 10b extending generally in a vertical direction but being movable so that the seat frame moves generally forwardly without a great variation in height relative to the base from its backward position where the child is in a sitting position to its forward position where the child can recline or semi-recline in the seat.

During this movement the seat back 8 by swivelling at its upper portion to the backrest frame 3 through link 4 increases its angle from a position where the child is in a sitting position to where the child can lie back in a semi-reclined position.

In order to easily adjust this seat from the upright to the reclining position, each side of the base frame 1 in the vicinity of the attachment to the backrest frame 3 has provided thereon a bracket 11 including a series of notches 12 having oppositely directed recesses 12a. A locking link 13 is provided on the seat frame to extend backwardly and adapted to engage in a respective one of these notches so that when the locking link 13 is engaged in a notch 12 the seat is effectively restrained from both forward and backward movement by engaging in the recesses 12a but that the locking link 13 can be manipulated to be placed in a further notch 12 to allow the seat to take up a number of positions from a general upright seating position to a reclined generally sloping position in which the child may sit and sleep.

The seat back frame is pivoted to the seat frame to allow this pivoting movement to take place and also the seat can include a foot rest frame 14 or portion to allow the child's feet to rest in this foot rest portion so that the child's shoes or the like will not be in contact with the seat portion of the vehicle.

As shown the seat frame is fitted with a moulded or shaped seat portion 15, and the back rest frame 3 has fitted thereto a back portion 16. The seat portion 15 and back portion 16 can be moulded from one of the rigid plastics materials, and have suitable padding and covering applied thereto.

In an alternative form the base of the seat can have incorporated thereon a tray like member so that the weight of the seat is distributed across the whole area of the tray like member so that this does not produce localised pressure on the vehicle seat which could be detrimental to the moulding and shaped portions of those seats.

Figure 8:
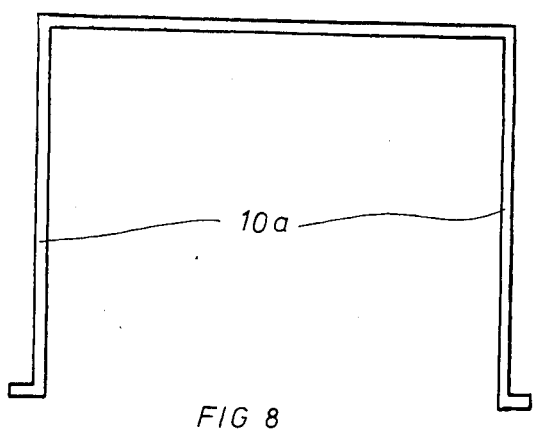

As shown in FIG. 1, the parallel links 10a, 10b can be formed of two U-shaped members, so that each member as shown in FIG. 8 has a pair of legs 10a (or 10b) and a cross member joining the legs, the cross member passing through holes in the seat frame 7 and pivoted in holes in the base 2.

Figure 7:
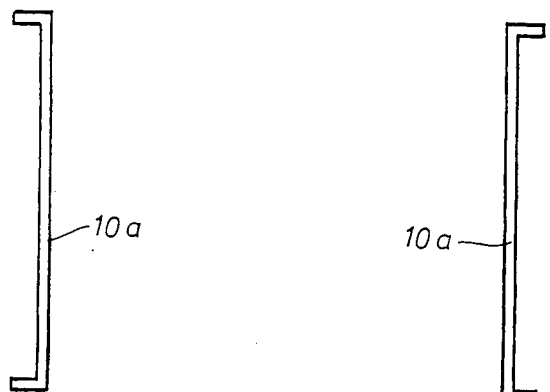
FIGS. 7, 8 and 9 show three alternate link mechanisms.

Alternatively as shown in FIG. 7, the links 10a (or 10b) can have pivot portions at each end which are journaled in holes in the seat frame 7 and base 2.

Figure 3:
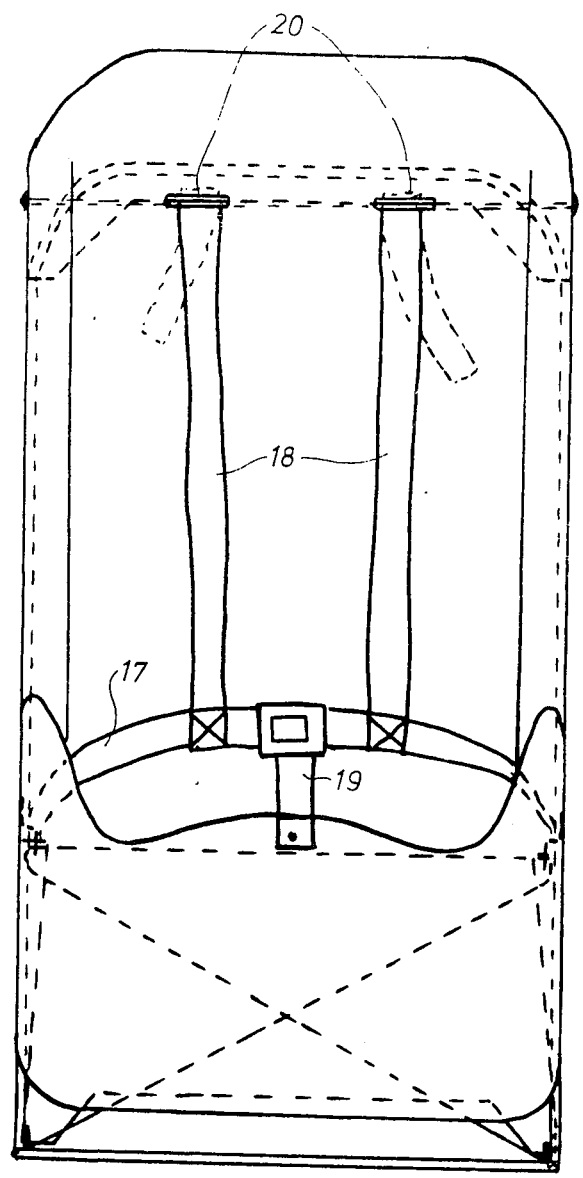
FIG. 3 is a front view of an alternative embodiment.
Figure 9:
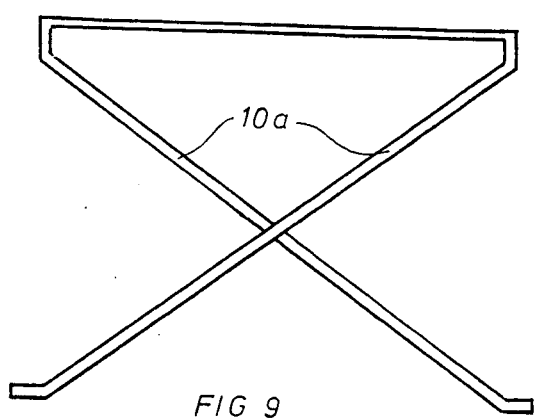

In a further alternative, as shown in FIG. 9, and as illustrated in the embodiment of FIG. 3, the links 10a instead of being in a vertical plane, extend across the seat to extend from one side to the other, and are joined to a cross piece extending across the seat frame 7. This alternative gives greater rigidity to side loads and forces on the seat.

Figure 4:
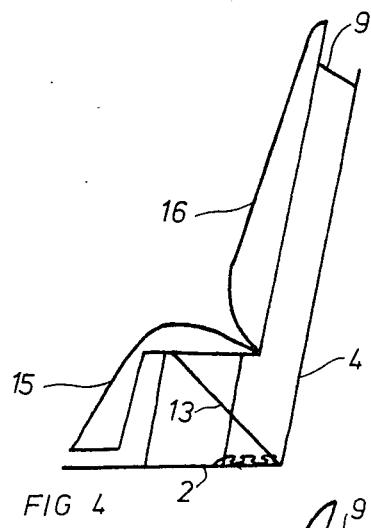
FIGS. 4, 5 and 6 show the seat in successive positions.
Figure 5:
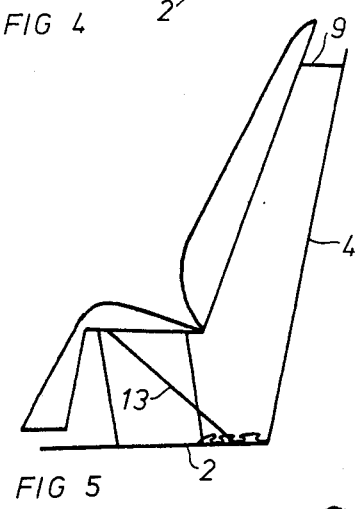
Figure 6:
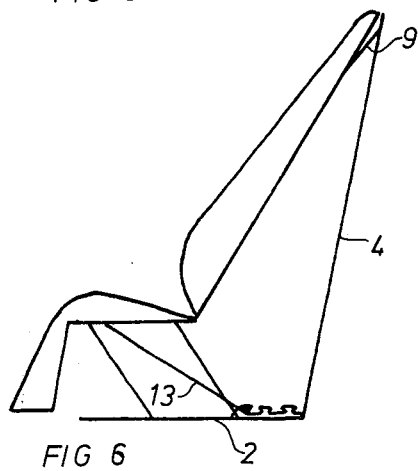

FIGS. 4, 5 and 6 show the seat in three different positions, from an upright sitting position to an intermediate position and as shown in FIG. 6 a reclined position.

FIG. 3 shows a front view of the seat with portions being dotted, and the harness in position. The harness includes a lap belt 17 and shoulder straps 18 and a central crotch strap 19. The lap belt 17 can be anchored to the frames, preferably to the frame 7 at or near the junction of the frame 7 to the frame 8.

Figure 10:
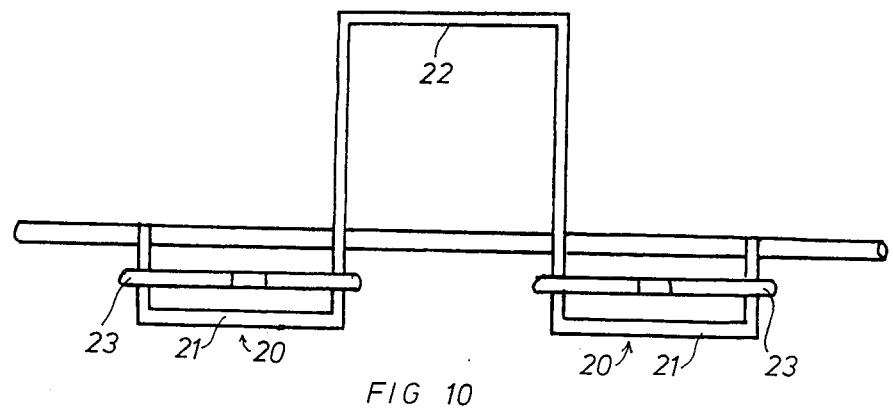
FIGS. 10, 11 and 12 show a plan rear view and side view of a strap fastening system.
Figure 11:
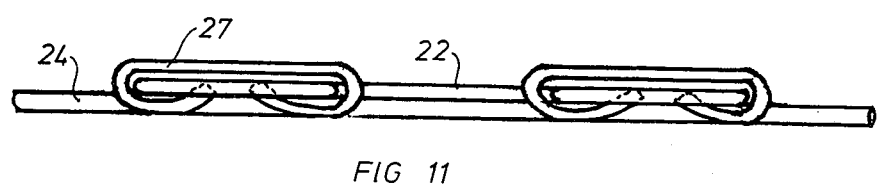
Figure 12:
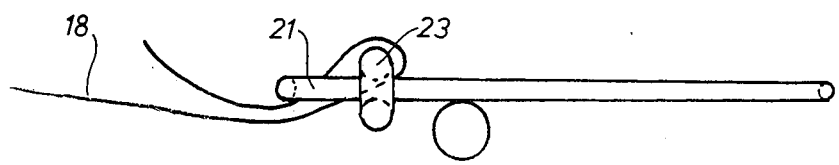

The shoulder straps 18 pass upwardly and over the shoulders and to be anchored by anchors 20. As shown in FIGS. 10–12, the anchors 20 are formed by loops 21 joined by a U-shaped handle 22. Each loop 21 has a slidable link 23 formed by a length of rod or wire with the ends of the rod or wire bent and inturned to retain the links on the loops. The strap 18 passes upwardly through a loop 21, behind a link 23 and over the link 23 to pass again under the link 21, so that tension on the strap 18 slides the link against the loop 21 to lock the strap therebetween.

The handle 22 is attached as by welding or the like to the cross bar 24, the links 9 being pivoted to this cross bar 24 by loops (not shown) on the links 9.

In another form the links attaching the seat back to the back rest frame can comprise a U-shaped link which is mounted on brackets on the seat back, the arms of the U being pivoted in holes in the back rest frame, and due to the positioning of the back rest frame relative to the base, and to the links supporting the seat frame, while the seat frame can move forwardly to a certain degree the seat back does not have a large vertical movement but is sufficient to allow the slope of the seat back to be increased sufficiently for the sleeping or slumber position of a child.

The main framing members of the seat itself can be formed of metal, which can either be chromed or plastic coated as desired, and the seat body itself to be attached to the seat frame can be a moulded plastic or fibre-glass seat having suitable shaping and suitable covering with either sponge or other padding material covered finally with a suitable fabric.

The seat belt for the child can be a full harness type to be readily and easily fitted to the child and adjusted therein, and the seat base and back rest frame can have a suitable U-shaped bracket pivoted thereto to engage in the space between the seat and back of the vehicle seat to assist in restraining the child's seat in position, the child's seat being anchored by the flat portion of the seat belt passing over the base and back rest frame of the seat and the top of the child's seat can be anchored over the back of the vehicle seat to a suitable anchorage point to securely restrain the same in position.

Although one form of the invention has been described in some detail it is to be realised that the invention is not to be limited thereto but may include various alterations and modifications falling within the spirit and scope of the invention.

I claim:

1. A child car seat comprising a base frame adapted to rest on a vehicle seat, a back rest frame extending upwardly and rearwardly therefrom so that the base frame and back rest frame are at a suitable angle to each other conforming to the general angle of the car seat itself, characterised by a seat frame and a seat back pivoted to each other, the seat frame being attached to the base frame by pairs of parallel links, and the seat back toward its upper end is linked to the back rest frame by a link extending therebetween, the parallel linkage moving the seat frame downwardly and forwardly in a parallel manner from a sitting to a reclining position, with the seat back moving also downwardly and forwardly at its bottom to increase its angle of inclination to a reclining position upon such downwardly and forwardly movement of the seat frame, and locking means to restrain the seat frame and seat back in their respective desired positions relative to the base frame and back rest frame by a locking link extending between the seat frame and the base frame.

2. A child car seat as defined in claim 1, characterised in that the locking means comprises a locking link that is pivoted to the seat frame at one end and engageable in locking notches in a bracket on the base frame, the locking link extending generally forwardly and upwardly from the bracket to the seat frame.

3. A child car seat as defined in claim 1, characterised by a restraining belt on the seat, the belt including shoulder portions each engageable around a link slidable on parallel arms of a loop so that the straps can be drawn against the loop and locked thereto.

4. A child car seat as defined in claim 1, where said link extending between said seat back and said back rest frame extends downwardly at an acute angle from the seat back when the seat frame is in a sitting position, but where the same link pivots and extends upwardly from said seat back when the seat frame is in a reclining position.

* * * * *